United States Patent [19]

Hibner

[11] 4,337,983
[45] Jul. 6, 1982

[54] VISCOUS DAMPER

[75] Inventor: David H. Hibner, Colchester, Conn.

[73] Assignee: United Technologies Corporation, Hartford, Conn.

[21] Appl. No.: 215,303

[22] Filed: Dec. 11, 1980

[51] Int. Cl.³ .......................................... F16C 27/04
[52] U.S. Cl. .............................. 308/26; 308/184 A; 308/187.1
[58] Field of Search ................. 308/26, 184 A, 187.1, 308/184 R, 187.2, 207 A, 207 R

[56] References Cited

U.S. PATENT DOCUMENTS

| Re. 30,210 | 2/1980 | Buono et al. | 308/184 R |
| 3,756,672 | 9/1973 | Hibner et al. | 308/189 A |
| 3,915,521 | 10/1975 | Young | 308/184 R |
| 4,214,796 | 7/1980 | Monzel et al. | 308/26 |

Primary Examiner—Lenard A. Footland
Attorney, Agent, or Firm—Norman Friedland

[57] ABSTRACT

The characteristics of a viscous damper for high speed bearings of a gas turbine engine are changed by providing recirculation grooves at the outer edge of the inner diameter of the damper annular wall. Reduced shaft excursions are evidenced without affecting the size, oil flow and stiffness characteristic of the damper.

3 Claims, 7 Drawing Figures

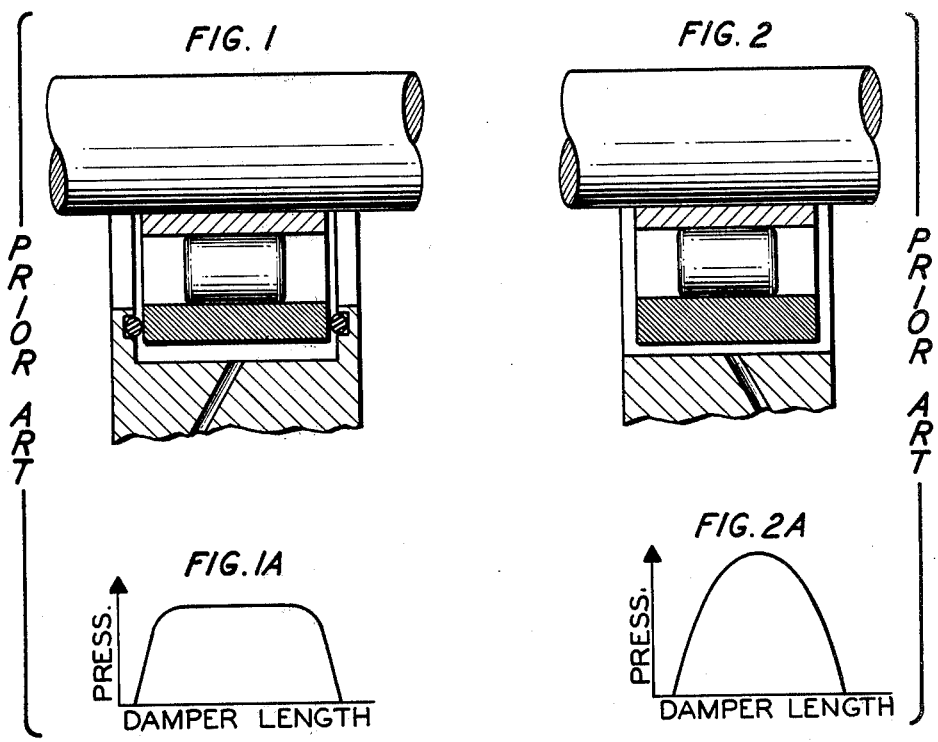
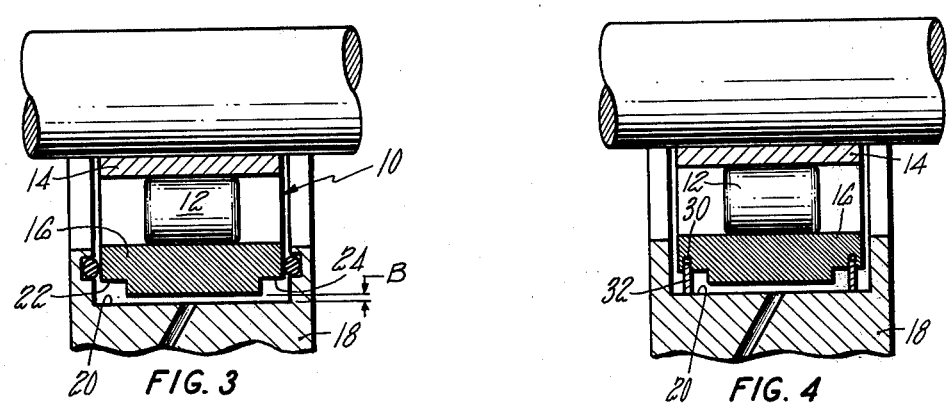
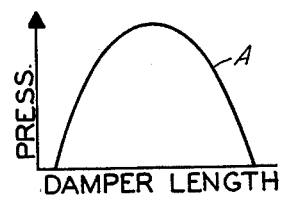

VISCOUS DAMPER

DESCRIPTION

1. Technical Field

This invention relates to gas turbine engines and particularly to viscous dampers utilized with the bearings of the engine rotors.

2. Background Art

The problem solved by this invention is best understood by considering the prior art dampers. As is well known, it is common practice to incorporate viscous dampers for high speed bearing supported jet engine rotors. The viscous dampers serve to stabilize the whirl motion that is inherent in rotating machinery.

FIGS. 1, 1A, 2 and 2A exemplify prior art dampers. As noted from the pressure profile of each damper, the unsealed damper of FIG. 2 provides a higher peak pressure but an equivalent total pressure force of the sealed damper of FIG. 1. This equivalency results directly from the reduced radial clearance in the FIG. 3 damper which in turn produces lower rotor excursions and a resulting engine efficiency improvement. However, because the annular cavity surrounding the outer race of the bearing is not sealed the flow of oil to maintain the oil pressure in that cavity is extremely high. Such a design requires perhaps 10-20% of the oil that is required in the FIG. 2 damper.

I have found that I can obtain the benefits of both damper designs, that is, a lower rotor excursion of the FIG. 2 damper and utilize the lesser amount of oil similar to the FIG. 1 damper and achieve equivalent damper characteristics by modifying the annular surface of the damper. Thus, according to this invention, provide circumferential grooves at the end faces of the damper face to allow oil recirculation which simulates the out flow of the FIG. 3 damper.

In addition to the equivalent load capacity of the FIG. 1 damper and the reduced oil flow requirement and clearance of the FIG. 2 damper the viscous damper incorporating my invention affords the following advantages:

1. Permits a more accurate prediction of damper force.
2. Does not require stops to limit the radial excursions of the engine shaft.
3. Requires less than ½ the clearance than conventional damper design and hence limits radial excursions by a like amount.

DISCLOSURE OF INVENTION

An object of this invention is to provide an improved viscous damper adapted for use with high speed bearings.

A feature of this invention is the inclusion of circumferential grooves formed at the side edges of the inner surface of the damper. One design incorporates "O" seals and another incorporates piston ring seals.

Other features and advantages will be apparent from the specification and claims and from the accompanying drawings which illustrate an embodiment of the invention.

BRIEF DESCRIPTION OF DRAWINGS

FIG. 1 is a schematic of a prior art viscous damper.

FIG. 1A is a pressure profile of the viscous damper of FIG. 1.

FIG. 2 is a schematic of a prior art viscous damper.

FIG. 2A is a pressure profile of the viscous damper of FIG. 2.

FIG. 3 is a schematic of a viscous damper incorporating this invention's "O" ring for sealing.

FIG. 3A is a pressure profile of the viscous damper of FIG. 3.

FIG. 4 is a schematic of a viscous damper incorporating this invention and utilizing piston rings for sealing.

BEST MODE FOR CARRYING OUT THE INVENTION

The viscous damper described herein is similar to the type described in reissue U.S. Pat. No. Re 30,210 granted to D. F. Buono, N. G. Carlson, D. C. Moringiello and myself and assigned to the assignee of this patent application and the details thereof are incorporated herein by reference.

As is shown in FIG. 3, the roller bearing generally illustrated by reference numeral 10 comprises a plurality of circumferentially spaced rollers 12 (one being shown), an inner race 14 and an outer race 16. A ring element 18 suitably grounded carries recess 20 which is continuously fed with pressurized oil. The above description describes well known viscous dampers.

According to this invention, the side ends are formed with circumferential grooves 22 and 24 which essentially define recirculation grooves. As the name implies because of the larger volume the oil squeezed by the rotating member relative to the stationary member tends to flow into and out of the recirculating grooves. The effect of this action produces a pressure curve (A) shown in FIG. 3A. While there is a relationship of the diameter of grooves 22 and 24 to the gap B and that the volume per unit of damper length should be significantly larger, these dimensions are best determined by actual testing.

It will be appreciated from the foregoing that leakage through the seal which is typical has less effect on this configuration than it would in the damper shown in FIG. 1. For this reason, it is easier to predict the performance of the damper of the type utilizing this invention as shown in FIG. 3 than the one shown in FIG. 1 since pressure is critically dependent upon leakage.

It is contemplated within the scope of this invention that piston seals as shown in FIG. 4 can be utilized or that proper clearance adjacent the seal area could eliminate the use of seals entirely. As can be seen in FIG. 4 the FIG. 3 damper is modified by including an annular groove 30 that accepts the piston ring 32. The damper is otherwise identical to the one shown in FIG. 3.

It should be understood that the invention is not limited to the particular embodiments shown and described herein, but that various changes and modifications may be made without departing from the spirit and scope of this novel concept as defined by the following claims.

I claim:

1. A viscous damper for a bearing having an outer race, a fixed annular member having a complimentary circular surface surrounding the outer diameter of said outer race and being spaced therefrom defining a circular cavity for receiving oil therebetween, sealing means disposed adjacent the side edges of said outer race to retain the oil in said circular cavity, recesses formed in said outer diameter of the outer race adjacent each of said side edges for increasing the volume where the oil between the space between said outer race and said complimentary circular surface can migrate, said recesses defining recirculating grooves so that the whirling motion imparted to the outer race by said bearing when in its rotating mode recirculates the oil within the circular cavity while permitting the pressure gradient along the expanse between said side edges to remain substantially at a fixed predetermined value.

2. A viscous damper as in claim 1 including side wall means extending radially from said fixed annular member in juxtaposed relationship with said side edges, and said sealing means includes "O" seals in said side wall means bearing against a surface of said side edges.

3. A viscous damper as in claim 1 wherein said sealing means includes piston rings extending radially from said recesses adjacent said side edges to bear against a portion of said complimentary circular surface.

* * * * *